R. M. Wilder,

Sheep Shears.

No. 3,889. Reissued Mar. 22. 1870.

N. PETERS, PHOTO-LITHOGRAPHER, WASHINGTON, D. C.

United States Patent Office.

ROBERT M. WILDER, OF COLDWATER, MICHIGAN, FOR HIMSELF, AND HIRAM B. ROBINSON, ASSIGNEE OF ROBERT M. WILDER.

*Letters Patent No.* 14,840, *dated May* 6, 1856; *reissue No.* 3,889, *dated March* 22, 1870.

IMPROVEMENT IN SHEEP-SHEARS.

The Schedule referred to in these Letters Patent and making part of the same.

*To all whom it may concern:*

Be it known that ROBERT M. WILDER, of Coldwater, in the county of Branch and State of Michigan, did invent certain new and useful Improvements in Sheep-Shears; and we do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use the invention, we will proceed to describe it.

This invention relates to shears for shearing sheep and similar purposes; and

The invention consists, primarily, in a rotating shearing-blade; and, secondarily, in arranging the same to be operated by mechanism, as hereinafter more fully described.

Figure 1:
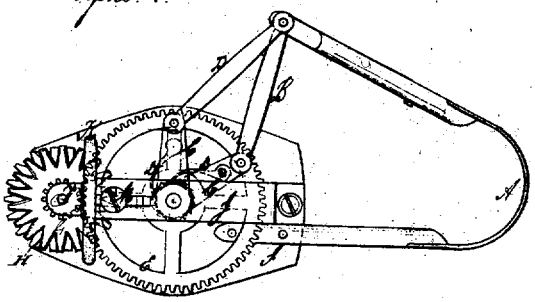
Figure 2:
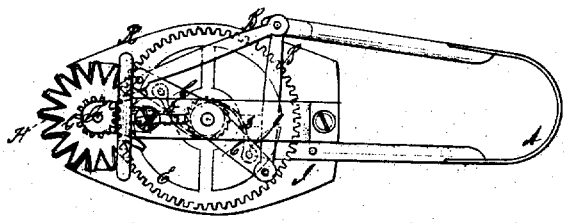
Figure 3:
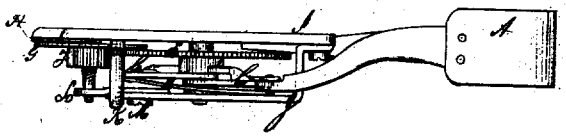

Figures 1 and 2 are top plan views of the apparatus arranged to be operated by hand, and Figure 3 is a side view of the same turned bottom side up.

In constructing the improved shearing device we first construct a rotary cutter, G. This cutter is made in the form of a disk, having a series of radially-projecting blades or teeth on its periphery, as represented in figs. 1 and 2.

This rotary cutter G is then mounted on a plate, H, which has at its front end a corresponding series of blades or teeth arranged in a circle, or the arc of a circle, corresponding to that of the cutter G, the latter being pivoted upon the former in such a manner as to permit it to rotate freely, and thus cause its radial blades, as they sweep past the stationary blades on the plate H, to act in connection with them as shear-blades.

The stationary blades H may be formed on the front end of the bed or bottom plate I, or they may be formed of a separate piece and secured thereto, as may be found most convenient in manufacture.

The rotary cutter G may be operated in any suitable manner, it only being necessary to impart to it a rotary motion to make it cut.

In arranging it for use as a hand-machine, we secure on the shaft of the rotary cutter G a pinion, F, which gears into a gear-wheel, E, mounted directly in rear of it, as shown in the drawings.

On the shaft of this wheel E we secure rigidly a ratchet-wheel, T, and on the same shaft pivot or hang loosely two levers, C, each having attached to it a spring pawl, D, arranged to engage in the ratchet-wheel T, as shown in figs. 1 and 2.

To the outer end of each of these levers C is pivoted another lever, B; and the outer end of these two levers B are both pivoted at the same point to an arm, L, which is connected by a spring, A, to a similar arm, L′, which in turn is rigidly secured to the base plate I, the spring A tending always to throw the arms L and L′ asunder, as represented in fig. 1.

By grasping these two arms in the hand, and compressing them or crowding them toward each other, the levers C are forced asunder at their outer ends, as represented in fig. 2, one being thrown forward and the other backward, the one that moves forward having its pawl D resting against a tooth of the ratchet-wheel T, and thereby imparting to said wheel a forward motion. At the same time the other lever C, with its pawl, is carried backward around the ratchet-wheel, so that, as soon as the grasp is relaxed on the arms L and L′, and the spring operates to throw them asunder, then this rear lever C, having its pawl engaged in the ratchet-wheel, operates to propel it forward, while, at the same instant and by the same outward movement of the arm L, the front lever C, with its pawl D, is drawn back ready for another forward movement. And thus the two levers C, with their pawls, operate alternately on the ratchet-wheel T, one moving back as the other moves forward, and *vice versa*, the two thereby imparting to the ratchet-wheel T, and, through it and the other wheels E and F, to the rotary cutter G, a continuous rotary motion.

The upper end of the shaft of the cutter G is supported in an adjustable plate, O, which is held in place by a screw, M, which works or passes through a slot in the plate J, so that, by moving this plate O out or in, the cutter G may be tipped so as to throw its teeth closer to or further from the teeth on the plate H, as may be necessary.

Having thus described the invention of the said ROBERT M. WILDER,

What we claim as new, and desire to secure by Letters Patent, is—

1. The rotary cutter G, when constructed and arranged to operate in a shearing apparatus, substantially as described.

2. The combination of the rotary cutter G and the stationary blades, both being arranged in a suitable frame to be held or guided by the hand, to form a portable shearing apparatus, substantially as set forth.

3. A shearing apparatus, consisting of a series of stationary blades with a rotary cutter, and the operating mechanism herein described.

4. The combination of the double-acting pawl and ratchet with the rotary cutter G, substantially as described.

ROBT. M. WILDER.
HIRAM B. ROBINSON.

Witnesses:
FRANK L. SKEELS,
N. P. LOVERIDGE.